United States Patent [19]

Summers

[11] Patent Number: 5,117,771
[45] Date of Patent: Jun. 2, 1992

[54] METHOD AND APPARATUS TO DECONTAMINATE SOIL

[75] Inventor: Burg W. Summers, Spring, Tex.

[73] Assignee: Vanguard Environmental, Inc., Houston, Tex.

[21] Appl. No.: 748,862

[22] Filed: Aug. 23, 1991

[51] Int. Cl.⁵ .............................................. F23G 5/12
[52] U.S. Cl. ................................. 110/346; 48/197 R; 110/110; 110/188; 110/229; 110/236; 432/31
[58] Field of Search ............... 110/236, 229, 346, 110, 110/188; 432/13, 31; 48/197 R; 241/DIG. 10

[56] References Cited

U.S. PATENT DOCUMENTS

| | | | |
|---|---|---|---|
| 4,738,206 | 4/1988 | Holand | 110/346 |
| 4,789,332 | 12/1988 | Ramsey et al. | 110/236 X |
| 4,974,528 | 12/1990 | Barcell | 110/236 X |

*Primary Examiner*—Edward G. Favors
*Attorney, Agent, or Firm*—L. Dan Tucker

[57] ABSTRACT

A method and apparatus for decontaminating soil that has been contaminated with vaporizable contaminants are disclosed. Contaminated soil is conveyed through a treatment vessel by means of an auger that has internal passages therein with a hot heat transfer fluid flowing through such passages. As the contaminated soil passes through the treatment vessel, it is heated to a point where the contaminants are vaporized and are withdrawn from the treatment vessel. The vaporized contaminants can be processed in suitable equipment to safely recover or dispose of such contaminants. Air is added to the interior of the treatment vessel from the atmosphere. Appropriate control means are present for controlling the amount of air added to the treatment vessel to ensure that the oxygen level in the mixture of vaporized contaminates and air does not fall within a flamable or explosive range. Following the vaporization of the contaminates from the soil, the thus treated soil is removed from the treatment vessel.

14 Claims, 1 Drawing Sheet

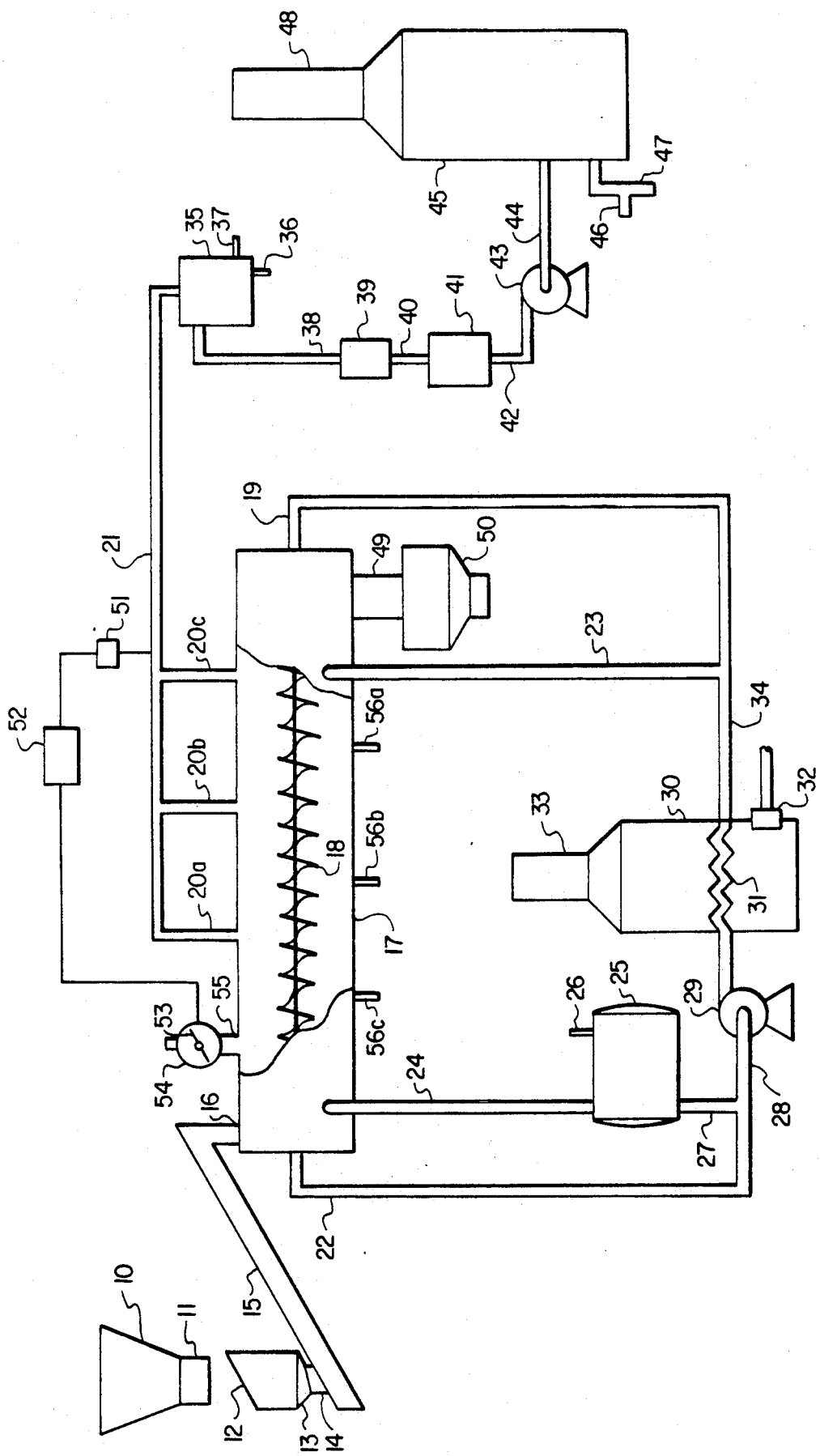

METHOD AND APPARATUS TO DECONTAMINATE SOIL

FIELD OF THE INVENTION

This invention relates to a method and apparatus to decontaminate soil. More particularly, this invention relates to a method and apparatus for removing vaporizable contaminants from soil. Even more particularly, the invention relates to a method and apparatus for removing vaporizable contaminants from soil by passing the soil through a chamber by means of heated auger conveyors to vaporize the contaminants, while controlling the amount of oxygen present in the chamber and thereafter disposing of the contaminants.

BACKGROUND

Vast quantities of natural soil have been contaminated with toxic and dangerous materials such as gasoline, diesel oil, cleaning solvents and the like. Until recently, little effort was exerted in decontaminating natural soils. However, it has now been realized that the presence of contaminants such as gasoline, diesel fuel, cleaning fluids, solvents and the like in soil pose tremendous environmental and health hazards. For example, there is increasing evidence that many organic liquids that contaminate soils are toxic and carcinogenic and find their way into drinking water formations from contaminated soils. Additionally, there is increasing evidence that organic contaminants from contaminated soil also find their way into rivers and streams to pollute and contaminate such waters thereby having an adverse affect on fish and wildlife.

Previous efforts to decontaminate soil that is contaminated with vaporizable contaminants have been directed to a variety of procedures. For example, various types of solvent extraction or washing procedures have been utilized in an attempt to wash the contaminants from the soil. Aside from being quite costly, such washing techniques have not been overly successful in removing such contaminants from soil. Other methods have involved heating soil in an attempt to vaporize the contaminants and drive the contaminants from the soil. Such prior heating processes have also been only partially successful. For example, heating processes that have involved heated kilns have not been too successful because of poor heat transfer, the tendency of moist soils to "ball up", dust formation and the like.

Recently, U.S. Pat. No. 4,738,206 issued to John W. Noland, wherein a method and apparatus for utilizing a heating vessel with a heated screw conveyor to heat soil as it is moved through the vessel to "vapor strip" contaminants from the soil. While the Noland method and appartus were improvements over previous methods and apparatus for decontaminating soil, they have severe operating problems. For example, the Noland method and apparatus provide for the exclusion of oxygen or air inside the heated stripping chamber. This necessity to exclude air from the heated chamber in the Noland method and apparatus poses severe operating problems in that air locks, seals in other apparatus have to be utilized to rigorously exclude the entry of air into the Noland heated chamber. It is therefore apparent that there is a need for a simplified and improved method and apparatus for decontaminating natural soil that has been contaminated with vaporizable contaminates.

It is therefore an object of this invention to provide an improved method and apparatus for decontaminating soil. It is another object of this invention to provide an improved method and apparatus for removing vaporizable contaminants from soil and safely disposing of such contaminants. It is yet another object of this invention to provide an improved method and apparatus for removing vaporizable contaminants from soil by passing the contaminated soil through a heated vessel while controlling the amount of oxygen in the vessel to prevent explosions and fires.

Additional objects and advantages of the invention described herein will be apparent to those skilled in the art upon an examination of the following specification and drawings.

SUMMARY OF THE INVENTION

In accordance with the present invention, a method and apparatus for removing vaporizable contaminants from soil are disclosed. In carrying out the invention, natural soil that is contaminated with vaporizable contaminants is transported through a heated treating vessel wherein the vaporizable contaminants are heated to a point where they are vaporized and the resulting vapor is withdrawn from the treating vessel and disposed of in a safe manner. The treating vessel is maintained at a slightly negative pressure to ensure that the vaporized contaminants are not exhausted or leaked into the atmosphere. The treating vessel also has air inlet ports provided whereby controlled amounts of air can be drawn into the treating vessel. Control means are provided to ensure that an explosive or flamable mixture of air and vaporized contaminants are not present within the system. To ensure good heat transfer within the treating vessel, the contaminated soil is moved through the treating vessel by means of a heated auger conveyor. The heated auger conveyor can be any commercially available screw-type conveyor that is heated such as a "holo-flite" screw conveyor. The residence time of the contaminated soil and the temperature within the treating vessel are controlled to provide for substantially complete vaporization of the vaporizable contaminants in the soil. As the vaporized contaminants are withdrawn from the treating vessel, a portion of the vaporized components and the air within the vessel are analyzed to ensure that there is not an unsafe amount of vaporized components present in the gas mixture as to cause a fire or explosion hazard. As a result of this sampling and testing, a control means is provided to regulate the amount of air that is added into the treating vessel to ensure there is no fire or explosion potential. At the outlet end of the treating vessel, the thus treated and decontaminated soil is removed and returned to the earth. The treating vessel can be equipped with a jacket whereby additional heat can be added to the treating vessel if desired. In a preferred embodiment, the hollow auger conveyor and the heating jacket around the treating vessel are filled with heat transfer oil which is heated in an oil heater and circulated through the auger and the jacket. Appropriate control means are provided for ensuring proper control of the oil temperature, the auger speed, the amount of oxygen admitted into the treating vessel and for safe and proper disposal of the vaporized contaminants.

DESCRIPTION OF THE DRAWINGS

A more complete understanding of the invention may be had by reference to the following detailed description when taken in conjunction with the drawing. The drawing is a schematic representation of the apparatus of the present invention.

DETAILED DESCRIPTION

In carrying out the present invention, soil that is contaminated with a vaporizable contaminate such as gasoline, diesel oil, organic solvents, cleaning fluids and the like, can be placed in feeder hopper 10. Feeder hopper 10 is operably connected with a size reduction means such as a pug mill, hammer mill or other type of grinder 11 to reduce the particle size of the contaminated soil to a relative small size for processing in the remainder of the system. It will be appreciated that since the vaporizable contaminants normally permeate the contaminated soil that the efficiency of the process of this invention is enhanced if the contaminated soil particles are relatively small. If the particle size of the contaminated soil is large, the soil will have a tendency to "dry out" on the surface and form a hard barrier whereby vaporizable components are trapped within the center of the large particle and will not be released during the treating process. After the soil is reduced in particle size to a particle size of preferably less than ⅛ of an inch in diameter, the soil particles then drop through the bottom of the size reduction unit 11 onto screen or mesh 12. The screen or mesh ensure that no large soil particles pass through the system. The thus screened soil particles then continue down below screen 12 into storage bin 13. An appropriate slide valve, gate or other control means can be placed on the bottom of storage bin 13 to ensure that the proper amount of soil is passed through the system to ensure an appropriate residence time for the removal of the vaporizable components from the contaminated soil. Soil then drops through discharge chute 14 into conveyor 15. Conveyor 15 can be any type of a conventional conveyor such as a belt conveyor, an auger conveyor, or the like. Conveyor 15 then moves the contaminated soil particles upwardly to above the discharge chute 16 which is in open communication with the interior of treatment vessel 17.

Treatment vessel 17 is preferably a horizontally mounted elongated treatment vessel that has a heat source whereby the contaminated soil particles can be conveyed through the treatment vessel while the particles are being subjected to heating by indirect heat exchange. In its simplest form, treatment vessel 17 can be a long cylindrical treatment vessel with an appropriate indirect heat exchange apparatus disposed therein. In a preferred embodiment, at least one heated auger conveyor can be utilized within the treatment vessel 17 to convey and heat the contaminated particles as they move through treatment vessel 17. More preferably there will be a pair of heated augers disposed in said treatment vessel. Thus, heated auger conveyors 18 are depicted in the drawing to illustrate one method of heating and conveying the contaminated soil particles along the path of the treatment vessel 17. The heated auger conveyors can be of the type supplied by the Denver Equipment Company of Colorado Springs, Colo. under the mark "holo-flite". These types of heated auger conveyors are more fully disclosed in U.S. Pat. Nos. 2,731,241 and 2,753,159. Such heated auger conveyors provide for an internally arranged passageway through which a heated heat transfer material such as hot oil can be pumped.

As more fully described below, the apparatus of the instant invention provides for an oil heater and an oil pump for heating the heat transfer oil and pumping it through the auger. As shown in the Figure, hot oil line 19 is connected to the end of the heated auger 18 for passing hot heat transfer oil through the internal passageway of the auger. As the hot transfer oil passes through the auger, heat is transferred from the hot transfer oil to the contaminated soil that is moved along by means of the rotating auger. For thermal efficiency, the hot oil flows countercurrent to the movement of the contaminated soil in treatment vessel 17.

The vaporizable soil contaminates are vaporized and are withdrawn from the treatment vessel by means of vapor withdrawal lines 20a, 20b and 20c. It will be appreciated that a plurality of vapor withdrawal lines are shown in the Figure, however, the presence of a plurality of vapor withdrawal lines is a preferred embodiment. In any case, however, at least one such vapor removal line must be present. The vapor removal lines all are in direct communication with vapor header 21 which passes the withdrawn vapor to downstream processing equipment which will be discusssed hereinafter.

Hot oil is removed from heated auger conveyors 18 by means of hot oil return line 22. If desired, the effectiveness of the instant invention may be enhanced by jacketing treatment vessel 17 with a jacket that can also be filled with hot oil to provide further indirect heat transfer of heat into the contaminated soil as it passes through treatment vessel 17. In such instance, hot oil can be pumped through the jacket surrounding the treatment vessel 17 by means of jacket hot oil inlet 23. As the hot oil flows through the jacket surrounding treatment vessel 17, heat energy passes through the wall of the jacket into the contaminated soil within the vessel as it is moved through the vessel by means of the heated auger conveyors 18. The hot oil can be removed from the jacket surrounding treatment vessel 17 by means of jacket hot oil return line 24. As illustrated in the Figure, the relatively low pressure jacket hot oil in jacket hot oil return line 24 can be passed to an appropriate hot oil surge tank 25 where it is stored for reheating in the equipment described below. Since there is a tendency for most hot oil used as heat transfer to oxidize, it is preferred to provide a blanket of nitrogen above the hot oil in the surge tank 25. Nitrogen can be added to provide such a blanket through nitrogen line 26.

In carrying out the heating step of the present invention, heating oil for the system can be withdrawn from the bottom of surge tank 25 by means of surge line 27 and that oil can be combined with the oil from hot oil line 22 and passed to supply line 28. Heating oil in supply line 28 feeds oil pump 29 which discharges oil into oil heater 30. Oil heater 30 has appropriate heating coils 31 disposed therein. Heater 30 can be any conventional type of heater that is fired with an appropriate fuel which is added along with oxygen through appropriate feed lines into burner 32. Combustion gases generated in conventional heater 30 are removed and vented to the atmosphere through stack 33. The thus heated oil is then withdrawn from heater 30 and passed by means of hot oil supply line 34 for recirculation through the system.

Gases that are gathered in vapor header line 21 are transported to downstream equipment for processing and disposal. For example, the gases can be treated to remove dust and particulate matter. They can also be passed through condensers to condense out and recover the vaporized contaminates. As shown in the Figure, item 35 can be a condenser and/or an optional oil-water separator 35. The purpose of the oil-water separator 35 is to allow for the "knock out" of condensed water and contaminates that may be condensed as the temperature of gases in vapor header line 21 decrease. Oil-water separator 35 is a conventional oil-water separator which provides for a water sump line 36 for removing condensed water and an oil sump line 37 for removing oil from the separator. The gases from oil-water separator 35 which contain the vaporized contaminants that are withdrawn from the treatment vessel 17 are then transported by way of demister inlet line 38 to a conventional demister 39 for further removal of any liquids from the gaseous stream. It will be appreciated that demister 39 is optional piece of equipment and can be either eliminated or bypassed if the contaminants that are removed from the contaminated soil are so volatile that there is no appreciable condensation as they are removed from the treatment vessel.

The vapors can also be passed through filter inlet line 40 to a conventional filter 41. It will be appreciated that when contaminated soil is treated in the manner disclosed that there is a likelihood that dust and other particulate matter will be carried over through the vapor transfer lines. Therefore, it is preferred to utilize filters 41 or some other type of particulate matter removal appartus to remove the dust particles or particulate matter before the vaporized stream is passed to a blower. It will be appreciated of course that filter 41 can be utilized along with other types of dust removal equipment such as cyclones and the like for removing the particulate matter. Following the treatment in filter 41, the vaporized material then passes through suction line 42 into blower 43. While the arrangement of equipment in the Figure shows filter unit 41 downstream of the optional demister, it is understood that filter 41 or a cyclone separator can be disposed upstream of any vapor treatment equipment. For example, if the vapor stream in vapor header 21, has considerable dust in it, a cyclone separator may be disposed in vapor header 21 before any effort is made to condense out any of the vaporized components.

Blower 43 is a conventional piece of equipment that will pull a suction on the upstream vapor gathering system. Since the overall system is to remove hazardous contaminants from contaminated soil, the system is preferably operated so that there is a slight vacuum exerted on the upstream vapor gathering and handling components. Therefore, by pulling a slight vacuum on the upstream vapor gathering and treatment apparatus, there will be a slight vacuum exerted inside the treatment vessel 17, along with the vapor gathering lines, the oil-water separator, demister, filters and the like. By using this slight vacuum, there will be little or no leakage of the vaporized contaminants or dust from the treatment vessel or other equipment into the atmosphere. As will be discussed hereinafter, the vacuum allows for the controlled intake of air into the interior of treatment vessel 17 with appropriate control means whereby the system can be operated without the danger of fire or explosion. Preferably, the blower will be sized and operated in such a fashion that the interior of treatment vessel 17 will have a vacuum of at least one inch of water. The vapor stream exits blower 43 through exhaust line 44 and is then passed to a vapor disposal system.

A preferred vapor disposal system for disposing of the vaporized contaminants from the contaminated soil is a conventional incinerator depicted as incinerator 45. In this preferred embodiment, vaporized contaminants, along with air and other gases, enter the incinerator through blower exhaust line 44 and are then incinerated by means of a conventional burner disposed within incinerator 45. Air for the incinerator is added by means of air line 46 and fuel can be added in the form of any conventional fuel such as natural gas, propane and the like through gas line 47. It will be appreciated that when high levels of volatile combustible contaminants are present in the gaseous mixture added to the incinerator that additional air must be added through air line 46. Likewise, when the air level in the gaseous mixture added to the incinerator is quite high, the amount of air or gas that is added to the incinerator via lines 46 and 47 can be decreased. The operation of incinerator 45 is rather straight-forward and will include conventional combustion control devices to ensure that there is a complete combustion of the contaminants inside the incinerator whereby exhaust gas which is exhausted from the incinerator through stack 48 is a mixture of carbon dioxide, nitrogen and oxygen. It will be appreciated that an excess of air will be present in the incinerator to ensure complete combustion of the fuel and contaminants. It will of course be understood that where environmental concerns require that the exhaust gas in stack 48 can be passed to other gas treatment apparatus such as scrubbers and the like. If desired, some of the waste heat from the gases exiting through stack 48 can be reclaimed by means of heat exchangers and the like.

In practicing the instant invention, it will be appreciated that soils that are contaminated with a variety of vaporizable contaminants can be treated. It will also be evident that if the contaminants that are to be removed from the soil are relatively volatile such as gasoline and the like that the temperature necessary to remove such contaminants can be much lower than when the soil contaminants are relatively high boiling materials such as motor oil and the like. Therefore, the nature of the contaminants to be removed will in great part influence the residence time as well as the temperatures that must be achieved within treatment vessel 17. As previously mentioned, as the contaminated soil enters through discharge chute 16, the contaminated soils will of course contain residual amounts of soil moisture, the contaminates and soil. As the materials progress through treatment vessel 17 by means of heated auger conveyors 18, the thus treated soil will exit treatment vessel 17 through discharge flume 49 and can be conveniently dumped into hopper 50 for removal from the equipment and transport to some area remote from the equipment. The treated soil that is ultimately removed from hopper 50 will contain little or no detectable contaminates. Therefore, it is safe to remove the treated soil from hopper 50 and return it directly to the hole from which it may have been excavated from. The consistency of the treated soil is a dry fine powdery material.

Periodic samples of the material exiting through discharge flume 49 should be utilized to ensure that the treatment vessel 17 is operated under the proper residence time and temperature conditions. A residence time of course can be controlled by controlling the variable speed heated auger conveyor rotation. The speed of the augers is within the skill of the art and commercially available control devices are not shown in the figures. In sampling the soil that exits through discharge flume 49, whenever it is detected that the contaminate level is not sufficiently low, the speed of the auger can be decreased to increase the residence time within treatment vessel 17. Additionally, the temperature of the hot oil flowing through the heated auger conveyors 18 as well as through the optional jackets surrounding treatment vessel 17 can be increased. It will be appreciated that the oil temperature that is passed through the auger conveyor will be above the boiling point of the contaminants to be removed. In normal operations, however, it has been found that an oil temperature of between about 400° F. and about 700° F. are sufficient to remove most contaminants such as gasoline, diesel oil, cleaning solvents and the like. It has also been found that a residence time of at least 20 minutes is desirable for treating the contaminated soil to remove the above mentioned components. The residence time of the soil in treatment vessel 17 is controlled by varying the auger rotation speed. It will however be appreciated that the proper adjustment of temperature and residence time is well within the skill of the art and can be adjusted by an operator having normal skill in the art in operating such equipment.

It will be appreciated that there will be certain instances wherein flamable or explosive mixtures of the vaporized contaminants and air can exist within treatment vessel 17 and within the vapor handling lines and equipment for removing the vapor from the system. Therefore, important features of the instant invention include method and apparatus for detecting hazardous mixtures of vaporized contaminants and oxygen within treatment vessel 17. To detect such hazardous levels or mixtures of vaporized contaminates in oxygen, an oxygen analyzer is disposed in vapor header 21. This analyzer has been depicted as analyzer 51 in the drawing. The output from analyzer 51 is passed to a control unit and controller with the output of such control unit and controller controlling the amount of ambient air that is pulled in to the treatment vessel. The control unit and controller 52 can be any conventional controller such as Servomex Model 1100A controller with the output of such controller being used to control butterfly valves 53 on air valves 54 which control the amount of air that is allowed to be pulled into the interior of treatment vessel 17 through air ports 55.

In operating the instant system, it will be appreciated that for various contaminants, there will be a range of contaminate to oxygen that will be explosive. Once the basic contaminants are identified from the soil to be treated, it is well within the skill of the art to predetermine what oxygen level exists for the explosive range of contaminant to oxygen. Once that range is determined, controller 52 can be programed to ensure that the amount of oxygen that is detected by analyzer 51 is well outside that predetermined range. Once that range is predetermined, the controller 52 can be conventionally programed to control butterfly valves 53 to ensure that sufficient air is pulled into the interior of treatment vessel 17 to ensure that no hazardous condition exists within the interior of treatment vessel 17 or the vapor handling lines. If the oxygen level in the interior of the vessel exceeds a safe level even when butterfly valves 53 are closed, an inert gas such as nitrogen, carbon dioxide and the like can be added to treatment vessel 17 through gas lines 56a, 56b or 56c. The amount of inert gas added is controlled by controller 52. In carrying out the invention, the amount of inert gas added is kept to a minimum for economic reasons.

The present invention thus provides and improved and safe method and apparatus for decontaminating soil that is contaminated with vaporizable contaminants. In carrying out the invention, it is expected that the operator will select the range of potentially hazardous mixtures of the vaporized contaminate and air and set controller unit 52 to control air valves 54 whereby the hazardous mixtures of vaporized contaminates and air, as detected by analyzer 51 are well outside the dangerous range. Thereafter, the operator will make periodic samplings of the treated soil that is discharged through discharge flume 49 and make appropriate adjustments in the residence time and temperatures within treatment vessel 17 to ensure the desired removal of the vaporizable contaminants from the soil as it is discharged through discharge flume 49. It will be appreciated that in a commercially operating system that the soil should not be "over treated" because such "over treatment" merely results in the consumption of fuel and energy in heating the oil and driving the auger system. Since the instant system provides for a highly efficient removal of the vaporizable contaminants from the soil, a skilled operator will be able to operate the system to achieve maximum efficiencies by regulating the auger speed, the oil temperature and the amount of air pulled into the treatment vessel through air ports 55.

While the foregoing specification has been written to describe the decontamination of "soil", such term is intended to mean natural soil as well as other solids such as sludges, sediments and the like.

While the invention has been described in detail above, it will be understood and appreciated that various changes and modifications may be made in the disclosed drawings and the operation thereof without departing from the spirit and scope of the invention.

Having described the invention above, what is claimed is:

1. A method for decontaminating natural soil that has been contaminated with vaporizable contaminants comprising:
   (a) placing contaminated soil in a treatment vessel;
   (b) conveying said contaminated soil through said treatment vessel by means of an auger conveyor while passing a heated heat transfer fluid through internal passages in the auger to heat the soil and thereby vaporize the contaminants therein;
   (c) controlling the rotation of said auger conveyor to provide a desired residence time within said treatment vessel;
   (d) controlling the temperature and flow rate of said heat transfer fluid flowing through said auger conveyor to provide for a desired temperature of the soil treated within said treating vessel;
   (e) pulling a controlled amount of air into said heat transfer vessel from the atmosphere to maintain a predetermined noncombustible and nonexplosive mixture of vaporized contaminants and oxygen;
   (f) collecting the vaporized contaminants;
   (g) passing the collected vaporized contaminants to a vapor processing apparatus; and
   (h) removing the thus treated soil from said treatment vessel.

2. The method of claim 1 further comprising analyzing the oxygen content of the mixture of air and vaporized contaminants withdrawn from said treatment vessel and controlling the amount of air pulled into said treatment vessel in response to such analysis to maintain a predetermined level of oxygen in said mixture of air and vaporized contaminants.

3. The method of claim 2 further comprising maintaining the treatment vessel at a pressure less than atmospheric pressure.

4. The method of claim 3 further comprising condensing the vaporized contaminants following their removal from said treatment vessel.

5. The method of claim 3 further comprising incinerating said vaporized contaminants after their removal from said treatment vessel.

6. The method of claim 3 further comprising removing dust and particulate material from the mixture of air and vaporized contaminants following their removal from said treatment vessel.

7. An apparatus for decontaminating natural soil that has been contaminated with vaporizable contaminants comprising:
 (a) a treatment vessel comprising a shell with an auger conveyor disposed therein, said auger conveyor having internal passages therein;
 (b) means for adding contaminated soil to said treatment vessel;
 (c) a means for heating a heat transfer fluid;
 (d) means for passing heated heat transfer fluid through the internal passages of said auger;
 (e) means for rotating said auger to convey contaminated soil through said treatment vessel;
 (f) means for collecting vaporized contaminants from said treatment vessel;
 (g) means for processing the collected vaporized contaminants;
 (h) means for adding air from the atmosphere into the interior of said treatment vessel;
 (i) means for controlling the amount of air added to the treatment vessel; and
 (j) means for removing treated soil from said treatment vessel.

8. The apparatus of claim 7 further including means for maintaining a pressure of less than atmospheric pressure in said treatment vessel.

9. The apparatus of claim 8 further including an analyzer to analyze the oxygen level of the mixture of air and vaporized contaminants removed from said treatment vessel.

10. The apparatus of claim 9 further including a control means for controlling the amount of air pulled into said treatment vessel in response to the amount of oxygen in the mixture of air and vaporized contaminants withdrawn from the treatment vessel to maintain a predetermined level of oxygen in said mixture.

11. The apparatus of claim 8 further including means for removing dust and particulate matter from the mixture of air and vaporized contaminants removed from said heat transfer vessel.

12. The apparatus of claim 8 further including a condenser means for condensing the vaporized contaminants that are withdrawn from the treatment vessel.

13. The apparatus of claim 8 further including means for incinerating the vaporized contaminants that are removed from the treatment vessel.

14. The apparatus of claim 8 wherein said means to maintain a negative pressure within said treatment vessel comprises a blower with the suction of said blower being in communication with the treatment vessel.

* * * * *